United States Patent
Horacek (10) Patent No.: US 7,527,283 B2
(45) Date of Patent: May 5, 2009

(54) COLLAPSIBLE STROLLER FOR CHILDREN AND THE LIKE

(76) Inventor: Gregor Horacek, Taunusstrasse 17, 56235 Ransbach-Baumbach (DE)

( * ) Notice: Subject to any disclaimer, the term of this patent is extended or adjusted under 35 U.S.C. 154(b) by 470 days.

(21) Appl. No.: 11/388,838

(22) Filed: Mar. 23, 2006

(65) Prior Publication Data

US 2006/0214396 A1 Sep. 28, 2006

(30) Foreign Application Priority Data

Mar. 24, 2005 (EP) ................................ 05 006 496

(51) Int. Cl.
*B62B 7/06* (2006.01)
*B62B 7/08* (2006.01)

(52) U.S. Cl. .................. 280/642; 280/29; 280/638; 280/639; 280/38; 280/641; 280/647; 280/650; 280/657; 280/658

(58) Field of Classification Search .............. 280/657, 280/58, 642, 641, 647, 658, 639, 87.05, 638, 280/47.34, 47.28, 79.2
See application file for complete search history.

(56) References Cited

U.S. PATENT DOCUMENTS 5,622,377 A 4/1997 Shamie
5,718,444 A * 2/1998 Huang ....................... 280/650
2003/0042710 A1* 3/2003 Suga ......................... 280/642
2003/0201626 A1* 10/2003 Hartenstine et al. ......... 280/642
2004/0227330 A1 11/2004 Everett

FOREIGN PATENT DOCUMENTS

DE 4004536 A1 8/1991
EP 1366968 A1 12/2003
GB 1419799 12/1975

* cited by examiner

*Primary Examiner*—Christopher P Ellis
*Assistant Examiner*—Bryan A Evans
(74) *Attorney, Agent, or Firm*—Price, Heneveld, Cooper, DeWitt & Litton, LLP (57) ABSTRACT

A collapsible stroller for children and the like includes front and rear struts interconnected by at least one transverse strut and a pair of longitudinal struts. Ground-engaging wheels are mounted at the lower ends of the front and rear struts. A push handle adapted for grasping includes lateral extensions having lower ends pivotally connected with a pair of slides, which are in turn slidingly connected with the upper portions of the rear struts to permit the push handle to be shifted between unfolded and folded configurations. A pair of support levers have opposite ends pivotally connected with the lower portions of the handle extensions and the upper portions of the front struts to permit shifting the stroller between the folded and unfolded configurations.

18 Claims, 6 Drawing Sheets

COLLAPSIBLE STROLLER FOR CHILDREN AND THE LIKE

CLAIM OF PRIORITY

Applicant hereby claims the priority benefits under the provisions of 35 U.S.C. § 119, basing said claim of priority on European Patent Application Serial No. 05 006 496.3, filed Mar. 24, 2005. In accordance with the provisions of 35 U.S.C. § 119 and Rule 55(b), a certified copy of the above-listed European patent application will be filed before the grant of a patent.

BACKGROUND OF THE INVENTION

The present invention relates to strollers for children and the like, and in particular to a folding or collapsible stroller.

A folding stroller is disclosed in DE 40 04 536 A1. In it, a compact folding dimension is achieved since the kinematic requirements allow a parallel position of front and rear struts and the lateral extensions of the pushing handle. However in this stroller, it is disadvantageous that the rear struts are connected by brackets fastened to them with only connection by force to the front struts and otherwise are only connected to the longitudinal struts and swivel-mounted by way of strut extensions connected to the rear struts with an extension of the pushing handle. Because of this, a stable and thus form-fitting connection of front and rear struts does not exist. Besides that, when the stroller is lifted, the rear struts release from the front struts, namely in the area of the brackets. This, along with laterally acting forces experienced during maneuvering, causes a situation in which the front struts shift with respect to the rear struts. In the prior art stroller, it is also disadvantageous that, with the given kinematic requirements, a maximum compact folding dimension is not achieved because the handle grip of the pushing handle extends beyond the lower end of the front struts when the stroller is in the folded position. Finally, it is disadvantageous that, with the given kinematic requirements, the use of wheels with a diameter of more than 250 millimeters is impossible since, during the folding process, larger wheels bump against each other before the parallel position of front struts, rear struts and lateral pushing handle extensions is reached and prevent complete folding.

A folding stroller is also disclosed in GB 1 419 799. There the lateral extensions of the pushing handle are swivel-mounted directly on the rear struts so that, because of the resulting kinematic specifications, the stroller cannot be folded together in a way such that both the front and rear struts, as well as the pushing handle, come to rest so that they are parallel. It is much more the case that the arrangement of the parts causes the pushing handle to run at a sharp angle to the front and rear struts when the stroller is folded together. Apart from this, the direct mounting of the pushing handle in the rear struts leads to a situation in which the respective rear wheels are arranged at a distance from the front wheels when the stroller is folded, while the pushing handle pulls the rear struts almost parallel to the front struts shortly before the folded position of the stroller is reached. The arrangement of the rear wheels at a distance from the front wheels when the stroller is folded causes increased storage space in this position.

SUMMARY OF THE INVENTION

One objective of the present invention is to further develop a stroller of the type mentioned above in such a way that it eliminates the disadvantages described in the state of the art, and also has a stable connection of front and rear struts, as well as the most compact possible folding dimension even with the use of wheels with relatively large diameters, especially with diameters of more than 250 millimeters.

Another objective is achieved with a folding stroller of the type mentioned at the beginning with the following characteristics:
 the front struts each hold slides that can slide freely in their longitudinal direction;
 the lateral extensions of the pushing handle are swivel-mounted in the slides in the area of their ends turned toward the front struts;
 the rear struts are swivel-mounted in the slides in the area of their ends turned toward the front struts; and
 on both sides of the stroller, support levers are arranged, each of which engages so they can swivel on the front struts between the slides and the front wheels and on the lateral extensions of the pushing handle.

Thus according to at least one embodiment of the present invention, it is provided that a slide is provided on each side of the stroller, in which the front strut and rear strut assigned to the respective side are mounted. The support lever assigned to this side controls the sliding movement of the slide with respect to the front strut since on one side, it engages on the front strut and the assigned lateral extension of the pushing handle, by way of the pushing handle extension, which is also mounted in the slide. Because of this mounting of the parts and their arrangement, a very stable design results, particularly in the area of the front strut, rear strut and extension of the pushing handle.

In one embodiment of the present invention, the lateral extensions of the pushing handle are swivel-mounted in the slides above the front struts. In addition, preferably the rear struts are swivel-mounted in the slides below the front struts. In addition, advantageously the support levers that are arranged on both sides each engage below the slides on the front struts and above the slides on the lateral extensions of the pushing handle. The front struts advantageously run from the lower front to the upper top and especially define an angle of 35 degrees to 65 degrees with the resting surface of the stroller on the base on which the stroller rolls. The rear struts accordingly run from the bottom rear to the top front and especially define an angle of 40 degrees to 80 degrees with the resting surface of the stroller.

It is to be understood that the lateral strut and/or lateral struts can be not only a rod or rods that connect the front and rear struts to each other, whereby the stroller maintains its width dimension during folding. These terms are to be understood inclusively, e.g., with the meaning of cross strut or cross struts. If the front and rear struts are each connected by one or more cross struts, the stroller can also fold together with respect to its width as known from the state of the art. Preferably the cross struts are controlled in such a way that during folding of the stroller by moving the front and rear struts toward each other while swiveling the pushing handle, the front and rear struts of one side of the stroller are also moved toward the front and rear struts of the other side of the stroller.

It is to be understood that the longitudinal struts can be attached on the front and rear struts in different ways. For example, the longitudinal struts can be connected directly with the front and rear struts. However, an indirect connection is also conceivable, for example in that the longitudinal strut is connected to the front and/or rear strut by way of a spring housing fastened on the respective strut. Because of this, there is increased riding comfort when the stroller is pushed due to the suspension.

The front wheels, especially, of the stroller can be designed so that they can be steered, i.e., the respective front wheel is held in a bearing so that it can rotate, it being possible for this bearing in turn to rotate around a vertical axle in the front strut or an extension piece connected to it.

If four rigid wheels are used in the stroller, these especially have a large size, e.g., a diameter of 300 millimeters. If the stroller is provided with steered wheels on the front, these have a diameter of 190 millimeters; the rigid rear wheels have a diameter of 300 millimeters.

Other characteristics of the invention are described in the sub-claims, the description of the figures and the figures themselves, whereby it will be noted that all the individual characteristics and all combinations of individual characteristics represent further inventive designs.

These and other advantages of the invention will be further understood and appreciated by those skilled in the art by reference to the following written specification, claims and appended drawings.

BRIEF DESCRIPTION OF THE DRAWINGS

In the figures, the invention is explained using two embodiment examples, without being restricted to these.

They show.

DETAILED DESCRIPTION OF THE PREFERRED EMBODIMENTS

Figure 1:
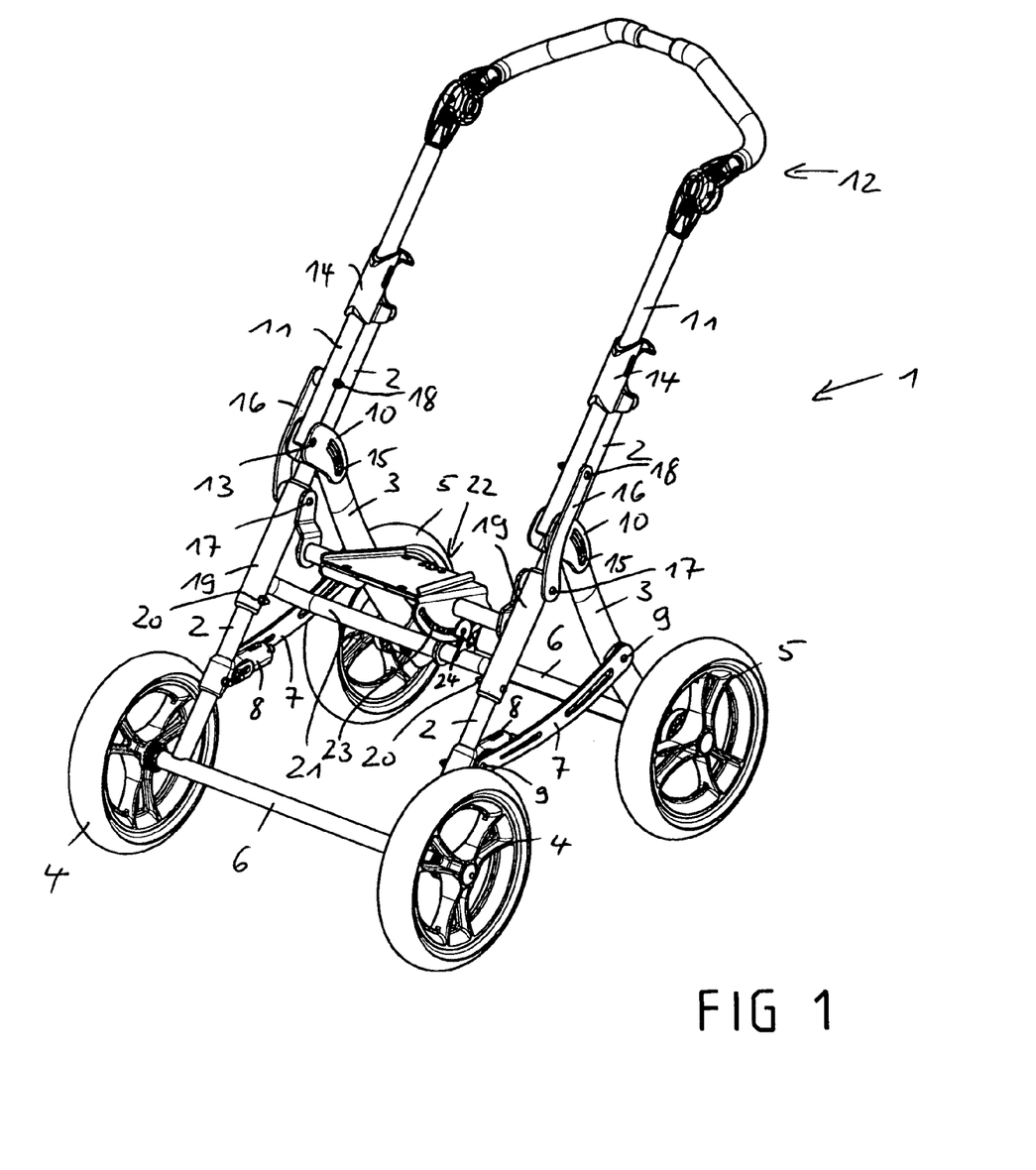
FIG. 1 shows a first embodiment of a folding stroller in a perspective view, shown unfolded, without a seat part and with front wheels that cannot be steered.
Figure 2:
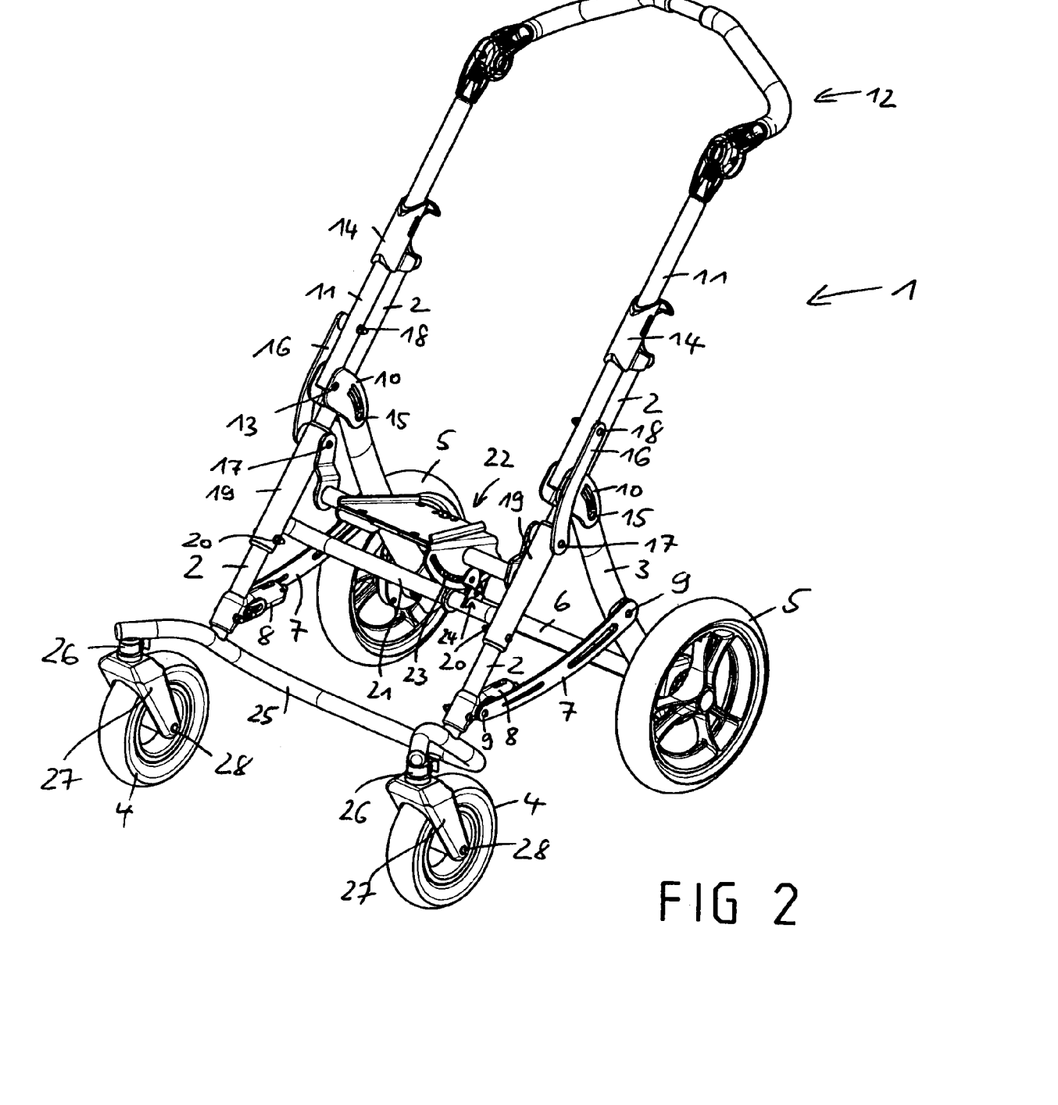
FIG. 2 shows a first embodiment of a folding stroller in a perspective view, shown unfolded, without the seat part and with front wheels that can be steered.
Figure 3:
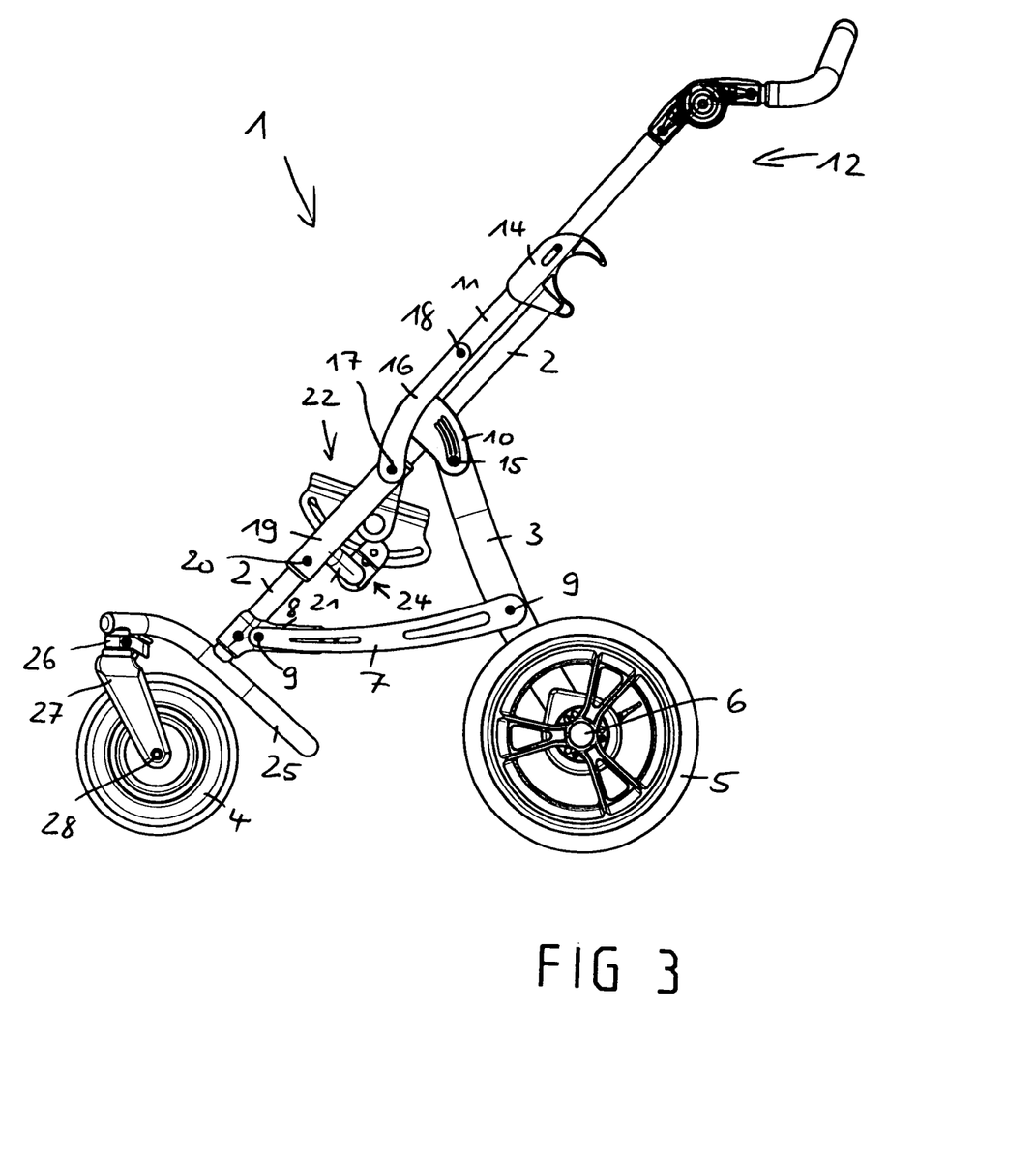
FIG. 3 shows a side view of the stroller shown in FIG. 2.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows the unfolded stroller 1 for children and youth. It has front struts 2 and rear struts 3 arranged on both sides of the stroller 1 to hold front wheels 4 and rear wheels 5. The front and rear struts 2, 3 are each connected by transverse struts 6 and 21. On both sides, longitudinal struts 7 are arranged, each of which engages on the front and rear struts 2, 3. In this case, the respective longitudinal struts 7 engage indirectly on the front struts 2, in that a pair of spring housings 8 are connected to the front struts 2, on which the longitudinal struts 7 engage. The swivel axles 9, in the area of the respective longitudinal struts 7, are mounted in the rear struts 3 and the spring housings 8.

Each of the illustrated front struts 2 holds a slide 10 that can be slid freely in its longitudinal direction. In longitudinal direction of the extensions 11, the lateral extensions 11 of pushing handle 12 hold sliding locking sleeves 14, which in the unfolded position of stroller 1 that is shown, can be lowered to the upper free ends of the front struts 2 and engage under them with a form fit, because of which the lateral extensions 11 of the pushing handle 12 that contact the front struts 2 cannot be pivoted away from the front struts 2.

The rear struts 3 are mounted below the front struts in slides 10 so they can pivot around swivel axles 15. Support levers 16 are mounted on both sides of the stroller 1 on the outside, each of which engages so that it can swivel around swivel axles 17 below the slides 10 on the front struts 2 and around swivel axles 18 above the slides 10 on the lateral extensions 11 of pushing handle 12.

Each of the illustrated front struts 2 holds a slide 10 that can be slid freely in its longitudinal direction. In the slides 10, the lateral extensions 11 of the pushing handle 12 are swivel-mounted in the area of their ends turned toward the front struts 2. Support levers 16 are arranged on both sides of the stroller 1, and engage the front struts 2 between slides 10 and front wheels 4, as well as the lateral extensions 11 of the pushing handle 12.

The front struts 2 extend from the lower front to the upper rear, and in the illustrated example, define an angle of 35 degrees to 65 degrees with the resting or support surface of stroller 1. The rear struts 3 extend from bottom rear to top front, and in the illustrated example, define an angle of 40 degrees to 80 degrees with the resting or support surface of stroller 1.

On the respective front strut 2, a sleeve-shaped element 19 is fastened by means of a screw nut connection 20 that passes through it and the front strut 2. The swivel axle 17 passes through the sleeve-shaped element 19 and the front strut 2 in the area of the end of the sleeve-shaped element 19 turned toward the slide 10. In the area of the other end of the same sleeve-shaped element 19, a U-shaped angled pipe 21 is connected to it, whereby the "U" is oriented perpendicular to the two front struts 2 in the direction of the longitudinal struts 7. A seat bracket 22 is swivel-mounted in the two swivel axles 17 and is used to hold and connect a seat (not shown) for the child or the youth. This seat bracket 22 is provided on the bottom with a slot 23 that is circular and runs concentrically to the swivel axis 17. The slot 23, which has the function of a bracket, passes through a device 24 that is connected to pipe 21 and is used for variable positioning of the seat bracket 22 in the different swivel positions relative to the swivel axle 17.

In the embodiment shown in FIG. 1, four rigid wheels 4, 5 are provided, and in fact they are of the same size, e.g., having a diameter of 300 millimeters each.

The embodiments shown in FIGS. 2 to 6 differ from the one according to FIG. 1 in that the stroller 1 is provided with front steered wheels 4, which have a diameter of 190 millimeters each. The rear wheels 5 are rigid, as before, and have a diameter of 300 millimeters each.

In this second embodiment (FIGS. 2-6), the lower free ends of front struts 2 are connected by an essentially U-shaped hoop 25, which in the area of the two free ends of the respective swivel axle 28, holds a U-shaped bearing part 27 that can swivel, and that is used for mounting the assigned front wheel 4, so that it can rotate around a swivel axle 28 of bearing part 27.

The process for folding or unfolding the stroller 1 is the same in both embodiments shown in FIGS. 1 and 2-6. It is shown in various intermediate steps and in the folded position for the second embodiment according to FIGS. 2 to 6, to which the following description will make reference.

In the illustrated stroller 1, the slides 10 and support levers 16 are mounted on both sides. The slides 10 are pushed from the top onto the front struts 2 and can slide freely on them. In the sections of slides 10 positioned above the front struts 2, the lateral extensions 11 of the pushing handle 12 are swivel-mounted in axle 13. In the sections of slides 10 that are positioned below the top struts 2, the rear struts 3 are swivel-mounted in axle 15. This creates a form-fitting connection between front struts 2 and rear struts 3.

Figure 4:
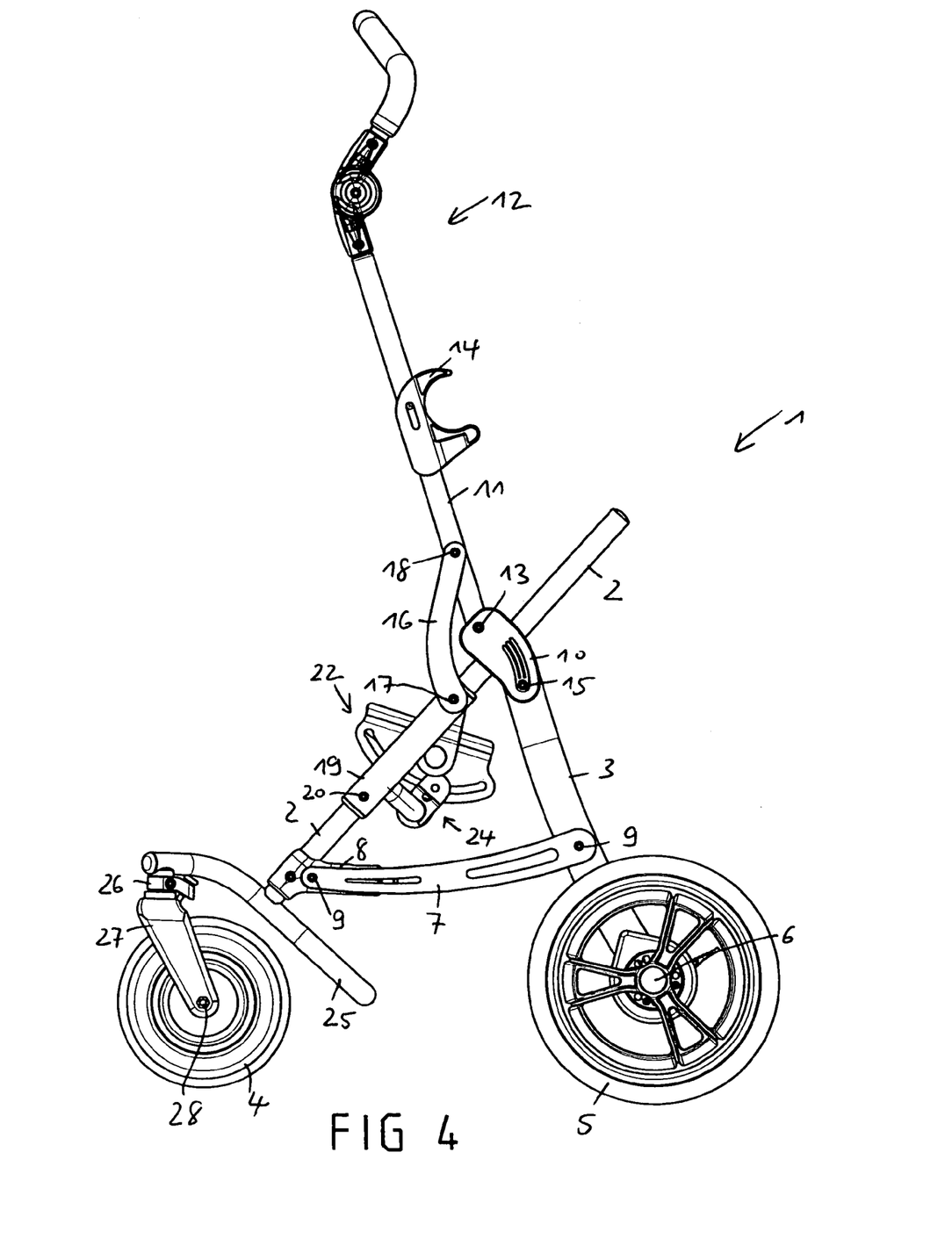
FIGS. 4 and 5 show the stroller shown in FIGS. 2 and 3 in intermediate positions while the stroller is being folded.
Figure 5:
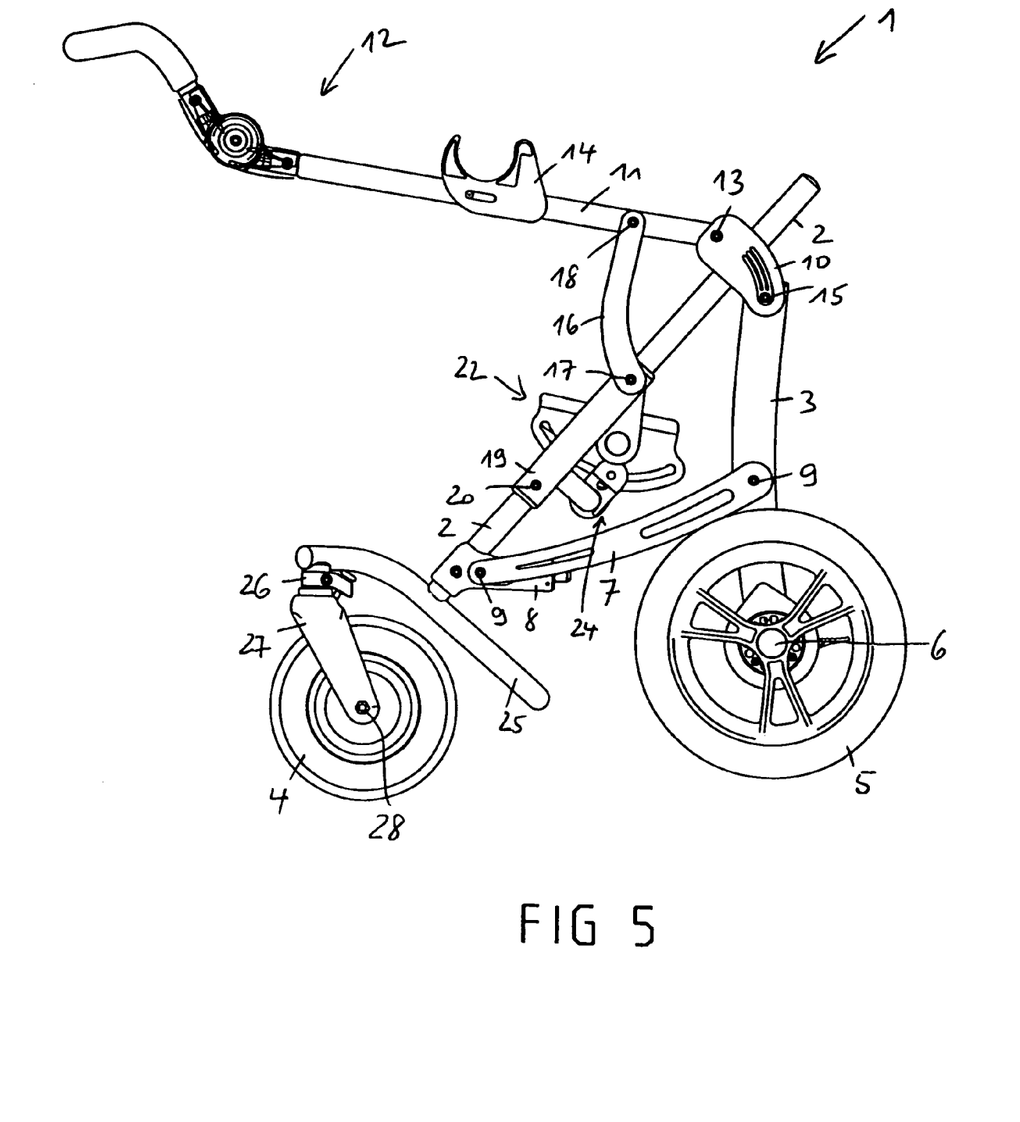
Figure 6:
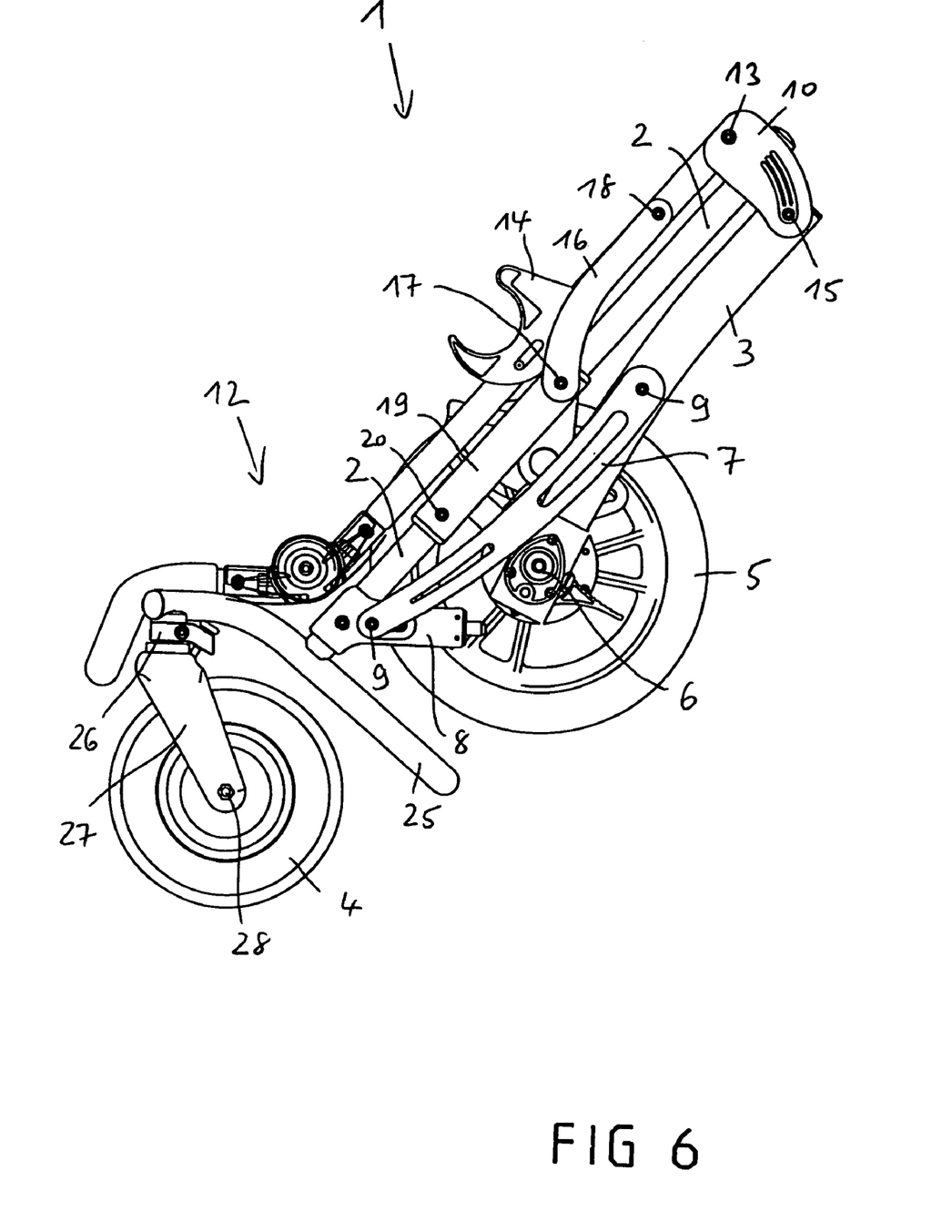
FIG. 6 shows the stroller according to FIGS. 2 to 5, in the completely folded position, but shown without the rear wheel that covers the stroller for better view of the individual parts.

The support levers 16 control the folding process, as can be seen from the illustrations of the intermediate positions of the stroller during folding according to FIGS. 4 and 5. In this case, the support levers 16 are mounted so that they can swivel with the lateral extensions 11 of pushing handle 12 in axle 18, and with the front struts 2 in the axle 17. When the pushing handle 12 is swiveled from below, for the purpose of folding the stroller 1, the support levers 16 are first also pivoted in the direction from below, while the slides 10 are slid upward on the front struts 2 by the pivoting movement of the lower sections of the lateral extensions 11 of pushing handle 12, and thus pull the rear struts 3 upward with them. During this folding process, as soon as axles 13, 15 and 18 lie on one plane, the swivel movement of the support levers 16 reverses toward the back again, so that at the end of the folding process they come into the compact initial position, while the lateral extensions 11 of the pushing handle 12 swivel further toward the bottom front, and the slides 10 are slid again in the direction of the upper end of the front struts. The longitudinal struts 7 are connected to axle 9 of the rear struts 3 and the axle 9 of the front struts 2, in each case so they can swivel and, during the folding process, guide the rear struts 3 in such a way that at the end of the folding process, they come as close as possible to the front struts 2. In the version shown, since the rear struts 3 are curved for design reasons, naturally it is impossible to reach a position parallel to the front struts 2.

The dimensions and positioning of the support levers 16 determine the position of the slides 10 and thus that of the pushing handle 12 in the unfolded or folded state. Optimum dimensions and positioning result from the wheel base, wheel size and the requirement of the shortest possible folding dimensions. This means that, with the given wheel base and given wheel size, the front struts 2 should be selected as short as possible, and both the position (axles 17 and 18) and the length (distance between axles 17 and 18) of the support levers 16 are to be determined such that the upper ends of each of the front struts 2 and slides 10 lie basically in one plane (matching) at the end of the folding process. The length and position of the longitudinal struts 7 (axles 8 and 9) are to be determined in such a way that the required wheel base is achieved in unfolded position, and the rear struts 3 come to rest as close as possible to the front struts 2 in folded position.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A collapsible stroller for children and the like, comprising:
   front and rear struts positioned on opposite sides of said stroller;
   at least one transverse strut extending laterally between and operatively interconnecting said front and rear struts in a side-by-side relationship;
   a pair of longitudinal struts extending longitudinally between and operatively interconnecting said front and rear struts;
   a pair of ground engaging front wheels mounted adjacent lower ends of said front struts for rollingly supporting at least a portion of said stroller on a support surface;
   a pair of ground engaging rear wheels mounted adjacent lower ends of said rear struts for rollingly supporting at least a portion of said stroller on a support surface;
   a push handle having a portion thereof configured for grasping, and oppositely disposed lateral extensions;
   a pair of slides having first ends thereof pivotally connected with lower portions of said lateral extensions of said push handle for rotation about first pivot axes, and second ends thereof pivotally connected with upper portions of said rear struts for rotation about second pivot axes; said slides being slidably connected with said front struts and can be slid freely in the longitudinal direction of said front struts to permit said push handle to be shifted between an unfolded configuration wherein said lateral extensions of said push handle are selectively connected with said front struts, and a folded configuration wherein said front and rear struts converge into a compact, nested relationship; and
   a pair of support levers having first ends thereof pivotally connected with the lower portions of said lateral extensions of said push handle for rotation about third pivot axes, which are spaced apart from said first pivot axes, and second ends thereof pivotally connected with media portions of said front struts for rotation about fourth pivot axes located between said slides and said front wheels to permit said stroller to be shifted between said folded and unfolded configurations.

2. A collapsible stroller as set forth in claim 1, wherein:
said first pivot axes are disposed above said front struts in said unfolded configuration.

3. A collapsible stroller as set forth in claim 2, wherein:
said rear struts are pivotally mounted in said slides at said second pivot axes which are at a position below said front struts in said unfolded configuration.

4. A collapsible stroller as set forth in claim 3, wherein:
said support levers are mounted so that the same swivel below said slides on said front struts and above said slides to said lateral extensions of said push handle.

5. A collapsible stroller as set forth in claim 4, wherein:
said front struts form an angle in the range of 35 to 80 degrees with the support surface.

6. A collapsible stroller as set forth in claim 5, wherein:
said rear struts form an angle in the range of 40 to 80 degrees with the support surface.

7. A collapsible stroller as set forth in claim 6, wherein:
said transverse strut comprises a rod.

8. A collapsible stroller as set forth in claim 7, wherein:
said longitudinal struts are connected with one of said front struts and said rear struts by a spring housing.

9. A collapsible stroller as set forth in claim 8, wherein:
said front wheels are pivotally mounted for steering.

10. A collapsible stroller as set forth in claim 9, wherein:
at least one of said front wheels and said rear wheels has a diameter of greater than 250 millimeters.

11. A collapsible stroller as set forth in claim 1, wherein:
said rear struts are pivotally mounted in said slides at said second pivot axes which are at a position below said front struts in said unfolded configuration.

12. A collapsible stroller as set forth in claim 1, wherein:
said support levers are mounted so that the same swivel below said slides on said front struts and above said slides to said lateral extensions of said push handle.

13. A collapsible stroller as set forth in claim 1, wherein:
said front struts form an angle in the range of 35 to 80 degrees with the support surface.

14. A collapsible stroller as set forth in claim 1, wherein: said rear struts form an angle in the range of 40 to 80 degrees with the support surface.

15. A collapsible stroller as set forth in claim 1, wherein: said transverse strut comprises a rod.

16. A collapsible stroller as set forth in claim 1, wherein: said longitudinal struts are connected with one of said front struts and said rear struts by a spring housing.

17. A collapsible stroller as set forth in claim 1, wherein: said front wheels are pivotally mounted for steering.

18. A collapsible stroller as set forth in claim 1, wherein: at least one of said front wheels and said rear wheels has a diameter of greater than 250 millimeters.

\* \* \* \* \*